(12) United States Patent
Veres et al.

(10) Patent No.: US 11,161,615 B2
(45) Date of Patent: Nov. 2, 2021

(54) STAGGERED PNEUMATIC ARTICULATION SYSTEM FOR SEAT BACK DEPLOYMENT AND COMFORT

(71) Applicant: B/E Aerospace, Inc., Winston-Salem, NC (US)

(72) Inventors: Martin Veres, Clemmons, NC (US); Mark Rychlicki, Winston-Salem, NC (US); Javier Valdes de la Garza, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 103 days.

(21) Appl. No.: 16/685,796

(22) Filed: Nov. 15, 2019

(65) Prior Publication Data
US 2021/0237882 A1    Aug. 5, 2021

(51) Int. Cl.
*B60N 2/02*  (2006.01)
*B64D 11/06*  (2006.01)
(Continued)

(52) U.S. Cl.
CPC ........ *B64D 11/0641* (2014.12); *B64D 11/064* (2014.12); *A47C 1/023* (2013.01);
(Continued)

(58) Field of Classification Search
CPC .. B60N 2002/0288; B60N 2/99; B60N 2/986; B60N 2/885; B60N 2/914; B60N 2/665;
(Continued)

(56) References Cited

U.S. PATENT DOCUMENTS 8,696,065 B2    4/2014  Udriste et al.
9,193,284 B2 *  11/2015  Line .................... B60N 2/0244
(Continued)

FOREIGN PATENT DOCUMENTS

CN    105799634 A      7/2016
DE    102015114382 A1 *  3/2017  ............. B60N 2/882
(Continued)

OTHER PUBLICATIONS

Extended Search Report for European Application No. 20207887.9 dated Mar. 30, 2021, 8 pages.

*Primary Examiner* — Syed A Islam
(74) *Attorney, Agent, or Firm* — Suiter Swantz pc llo

(57) ABSTRACT

In embodiments, an aircraft passenger seat assembly includes a seatback assembly including one or more lateral seatback sections. In embodiments, at least one lateral seatback section includes a base seatback panel coupled to a seatback frame, a first set of segmented seatback panels coupled to the base seatback panel, and a second set of segmented seatback panels coupled to the first set of segmented seatback panels. In embodiments, the aircraft passenger seat assembly further includes a plurality of actuatable assemblies, wherein the plurality of actuatable assemblies include a first set of actuatable assemblies configured to selectively actuate the first set of segmented seatback panels relative to the base seatback panel, and a second set of actuatable assemblies configured to selectively actuate the second set of segmented seatback panels relative to the first set of segmented seatback panels.

13 Claims, 14 Drawing Sheets

(51) Int. Cl.
*A47C 1/023* (2006.01)
*B60N 2/90* (2018.01)
*A47C 1/024* (2006.01)
*B60N 2/66* (2006.01)
*B60N 2/885* (2018.01)
*A47C 7/14* (2006.01)
*B60N 2/70* (2006.01)

(52) U.S. Cl.
CPC ............... *A47C 1/024* (2013.01); *A47C 7/14* (2013.01); *B60N 2/665* (2015.04); *B60N 2/7082* (2013.01); *B60N 2/7088* (2013.01); *B60N 2/885* (2018.02); *B60N 2/986* (2018.02); *B60N 2/99* (2018.02); *B60N 2002/0288* (2013.01)

(58) Field of Classification Search
CPC .. B60N 2/7082; B60N 2/7088; A61G 5/1062; B64D 11/0641; B64D 11/064; A47C 1/023; A47C 1/024; A47C 7/14; A47C 7/54; A47C 7/142; A47C 7/467
See application file for complete search history.

(56) References Cited

U.S. PATENT DOCUMENTS

| | | |
|---|---|---|
| 10,189,391 B2 | 1/2019 | Gonzalez et al. |
| 2009/0102264 A1 | 4/2009 | Fischer et al. |
| 2018/0086468 A1 | 3/2018 | Beroth |
| 2018/0186251 A1 | 7/2018 | Yetukuri et al. |
| 2019/0031137 A1 | 1/2019 | Boccuccia et al. |

FOREIGN PATENT DOCUMENTS

| | | | |
|---|---|---|---|
| DE | 102017129856 A1 * | 6/2019 | ............. B60N 2/806 |
| FR | 3042172 B1 | 11/2017 | |
| WO | 2014147449 A1 | 9/2014 | |

\* cited by examiner

STAGGERED PNEUMATIC ARTICULATION SYSTEM FOR SEAT BACK DEPLOYMENT AND COMFORT

BACKGROUND

Passenger seat comfort is an important feature in the context of commercial aircraft. There is a need in the art for aircraft passenger seats which provide sufficient support for passengers, improve passenger seat comfort, and meet certain industrial design aesthetics. Conventional aircraft passenger seats are typically configured to pivot forward and backwards in order to recline the seatback and improve passenger comfort. However, conventional aircraft passenger seats typically provide limited capabilities to adjust the profile of the seatback. Accordingly, conventional aircraft passenger seats do not provide sufficient support for the lateral sides of a passenger's back and upper body. Therefore, there exists a need in the art which address one or more of the shortfalls of previous approaches identified above.

SUMMARY

An aircraft passenger seat assembly is disclosed. In some embodiments, the aircraft passenger seat assembly includes a seatback assembly including one or more lateral seatback sections. In embodiments, at least one lateral seatback section includes a base seatback panel coupled to a seatback frame, a first set of one or more segmented seatback panels coupled to the base seatback panel, and a second set of one or more segmented seatback panels coupled to the first set of one or more segmented seatback panels. In embodiments, the aircraft passenger seat assembly further includes a plurality of actuatable assemblies, wherein the plurality of actuatable assemblies include a first set of one or more actuatable assemblies configured to selectively actuate the first set of one or more segmented seatback panels relative to the base seatback panel, and a second set of one or more actuatable assemblies configured to selectively actuate the second set of one or more segmented seatback panels relative to the first set of one or more segmented seatback panels.

In some embodiments of the aircraft passenger seat assembly, selectively actuating the first set of one or more segmented seatback panels relative to the base seatback panel includes inducing a first set of offset angles between the first set of one or more segmented seatback panels and the base seatback panel. Similarly, in some embodiments of the aircraft passenger seat assembly, selectively actuating the second set of one or more segmented panels relative to the first set of one or more segmented panels includes inducing a second set of offset angles between the second set of one or more segmented panels relative to the first set of one or more segmented panels.

In some embodiments of the aircraft passenger seat assembly, the first set of one or more actuatable assemblies are coupled to one or more one or more support members and the first set of one or more segmented seatback panels, and selectively actuating the first set of one or more segmented seatback panels includes selectively actuating the first set of one or more segmented seatback panels with respect to the one or more support members.

In some embodiments of the aircraft passenger seat assembly, the first set of one or more actuatable assemblies are coupled to one or more one or more support members and the base seatback panel, and selectively actuating the first set of one or more segmented seatback panels includes selectively actuating the one or more support members with respect to the base seatback panel.

In some embodiments of the aircraft passenger seat assembly, the seatback assembly includes a first lateral seatback section including: a first base seatback panel coupled to the seatback frame, a first set of one or more segmented seatback panels coupled to the first base seatback panel, and a second set of one or more segmented seatback panels coupled to the first set of one or more segmented seatback panels. Similarly, in some embodiments of the aircraft passenger seat assembly, the seatback assembly includes a second lateral seatback section coupled to the first lateral seatback section, the second lateral seatback section including a second base seatback panel coupled to the seatback frame, a first set of one or more segmented seatback panels coupled to the second base seatback panel, and a second set of one or more segmented seatback panels coupled to the first set of one or more segmented seatback panels.

In some embodiments of the aircraft passenger seat assembly, the aircraft passenger seat assembly further includes a seat structure, wherein the seatback assembly is pivotably coupled to the seat structure.

In some embodiments of the aircraft passenger seat assembly, the first set of offset angles include one or more offset angles defined as an angle between a plane of the base seatback panel, and a plane of a segmented seatback panel of the first set of one or more segmented seatback panels. Similarly, in some embodiments of the aircraft passenger seat assembly, the second set of offset angles include one or more offset angles defined as an angle between a plane of a segmented seatback panel of the first set of one or more segmented seatback panels, and a plane of a segmented seatback panel of the second set of one or more segmented seatback panels.

In some embodiments of the aircraft passenger seat assembly, the plurality of actuatable assemblies include at least one of a pneumatic bladder, a hydraulic apparatus, a spring apparatus, or a mechanical actuator.

In some embodiments of the aircraft passenger seat assembly, the first set of one or more segmented panels include a first segmented panel coupled to a first lateral side of the base panel, and a second segmented panel coupled to a second lateral side of the base panel opposite the first lateral side.

In some embodiments of the aircraft passenger seat assembly, the second set of one or more segmented panels include a first segmented panel coupled to the first segmented panel of the first set of one or more segmented panels, and a second segmented panel coupled to the second segmented panel of the first set of one or more segmented panels.

In some embodiments of the aircraft passenger seat assembly, the first set of one or more segmented panels are pivotably coupled to the base panel, and wherein the second set of one or more segmented panels are pivotably coupled to the first set of one or more segmented panels.

In some embodiments of the aircraft passenger seat assembly, the aircraft passenger seat assembly further includes an additional set of one or more segmented panels coupled to the second set of one or more segmented panels.

In some embodiments of the aircraft passenger seat assembly, a front seatback surface of the seatback assembly is configured to support an upper body of a passenger, wherein the plurality of actuatable assemblies are configured to selectively actuate in order to adjust a profile of the front seatback surface.

In some embodiments of the aircraft passenger seat assembly, the first set of one or more segmented seatback panels include a first lateral wing assembly, and the second set of one or more segmented seatback panels include a second lateral wing assembly.

An aircraft passenger seat assembly is disclosed. In some embodiments, the aircraft passenger seat assembly includes a first segmented seatback panel coupled to a first lateral side of a base seatback panel, a second segmented seatback panel coupled to a second lateral side of the base seatback panel opposite the first lateral side, and at least one additional segmented seatback panel coupled to the first segmented seatback panel. In embodiments, the aircraft passenger seat assembly further includes a plurality of actuatable assemblies, wherein the plurality of actuatable assemblies include a first actuatable assembly configured to selectively induce an offset angle between the base panel and the first segmented seatback panel, a second actuatable assembly configured to selectively induce an offset angle between the base panel and the second segmented seatback panel, and at least one additional actuatable assembly configured to selectively induce an offset angle between the first segmented seatback panel and the at least one additional segmented seatback panel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
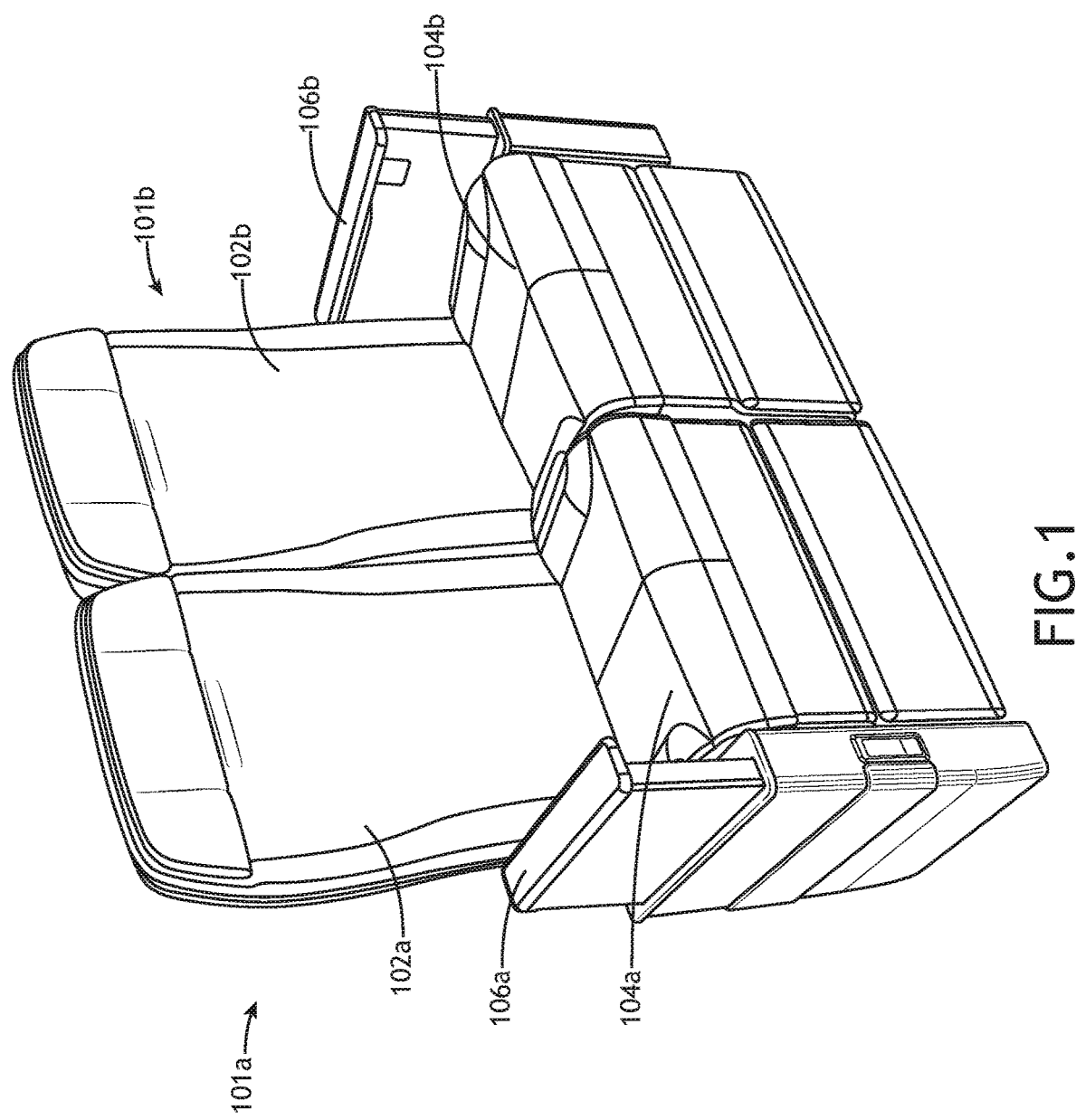
FIG. 1 illustrates a front perspective view of aircraft passenger seats in an upright position, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Passenger seat comfort is an important feature in the context of commercial aircraft. There is a need in the art for aircraft passenger seats which provide sufficient support for passengers, improve passenger seat comfort, and meet certain industrial design aesthetics. Conventional aircraft passenger seats are typically configured to pivot forward and backwards in order to recline the seatback and improve passenger comfort. However, conventional aircraft passenger seats typically provide limited capabilities to adjust the profile of the seatback. Accordingly, conventional aircraft passenger seats do not provide sufficient support for the lateral sides of a passenger's back and upper body.

Accordingly, embodiments of the present disclosure are directed to an aircraft passenger seat assembly which cures one or more of the shortfalls of previous approaches identified above. Embodiments of the present disclosure are directed to an aircraft passenger seat assembly including multi-staged seatback assembly. In particular, embodiments of the present disclosure are directed to a multi-staged seatback assembly including a first set of one or more segmented seatback panels, and at least one additional set of one or more segmented seatback panels. In this regard, embodiments of the present disclosure are directed to a seatback assembly including one or more staggered, multi-staged lateral wing assemblies. Additional embodiments of the present disclosure are directed to an aircraft passenger seat assembly including a plurality of actuatable assemblies configured to selectively actuate various seatback panels of a multi-staged seatback assembly.

It is contemplated herein that embodiments of the present disclosure may provide for an aircraft passenger seat which is able to selectively adjust a profile of an aircraft seatback. It is further contemplated herein that the multi-staged seatback assembly of the present disclosure may provide a more comfortable seating environment for passengers, while simultaneously providing improved support to the lateral sides of a passenger's back and upper body.

Reference will now be made in detail to the subject matter disclosed, which is illustrated in the accompanying drawings.

FIG. 1 illustrates a front perspective view of aircraft passenger seats 101a, 101b in an upright position, in accordance with one or more embodiments of the present disclosure. An aircraft passenger seat 101a may include, but is not limited to, a seatback 102a, a seat structure 104a, and one or more armrests 106a, 106b.

In many aircraft settings, aircraft passenger seats 101a, 101b are arranged in rows, as shown in FIG. 1. For example, a first aircraft passenger seat 101a may be positioned adjacent to a second aircraft passenger seat 101b. In embodiments, an aircraft passenger seat 101a, 101b may include a seatback 102a, 102b configured to support an upper body of an aircraft passenger, and a seat structure 104a, 104b upon which the aircraft passenger may be seated. The aircraft passenger seat 101a, 101b may further include armrests 106a, 106b on lateral sides of each aircraft passenger seat 101a, 101b. The armrests 106a, 106b may be configured to separate adjacent aircraft seats 101a, 101b, as well as separate aircraft seats 101a, 101b from an aisle or an outer wall of the aircraft.

Generally speaking, each aircraft passenger seat 101a, 101b may include a "seating environment" within which a passenger is seated, wherein the seating environment is approximately defined by the seatback 102a, 102b, seat structure 104a, 104b, and the armrests 106a, 106b. In embodiments, the seatback 102a, 102b of an aircraft passenger seat 101a, 101b may include a front seatback surface to support an upper body of a passenger, and a rear seatback surface which faces towards a passenger seated directly behind each respective aircraft passenger seat 101a, 101b.

In embodiments, the seatback 102a, 102b of the aircraft passenger seat 101a, 101b may be pivotably coupled to the seat structure 104a, 104b. In this regard, the seatback 102a, 102b may be configured to be selectively actuated and/or pivoted with respect to the seat structure 104a, 104b. For example, the seatback 102a, 102b may be positioned in an upright position with respect to the seat structure 104a, 104b, as shown in FIG. 1. The seatback 102a, 102b may then be configured to be selectively actuated or selectively pivoted through one or more reclined positions with respect to the seat structure 104a, 104b. For instance, the seatback 102a, 102b may be selectively pivoted to a supine position, wherein the seatback 102a, 102b is substantially parallel with the seat structure 104a, 104b.

Figure 2A:
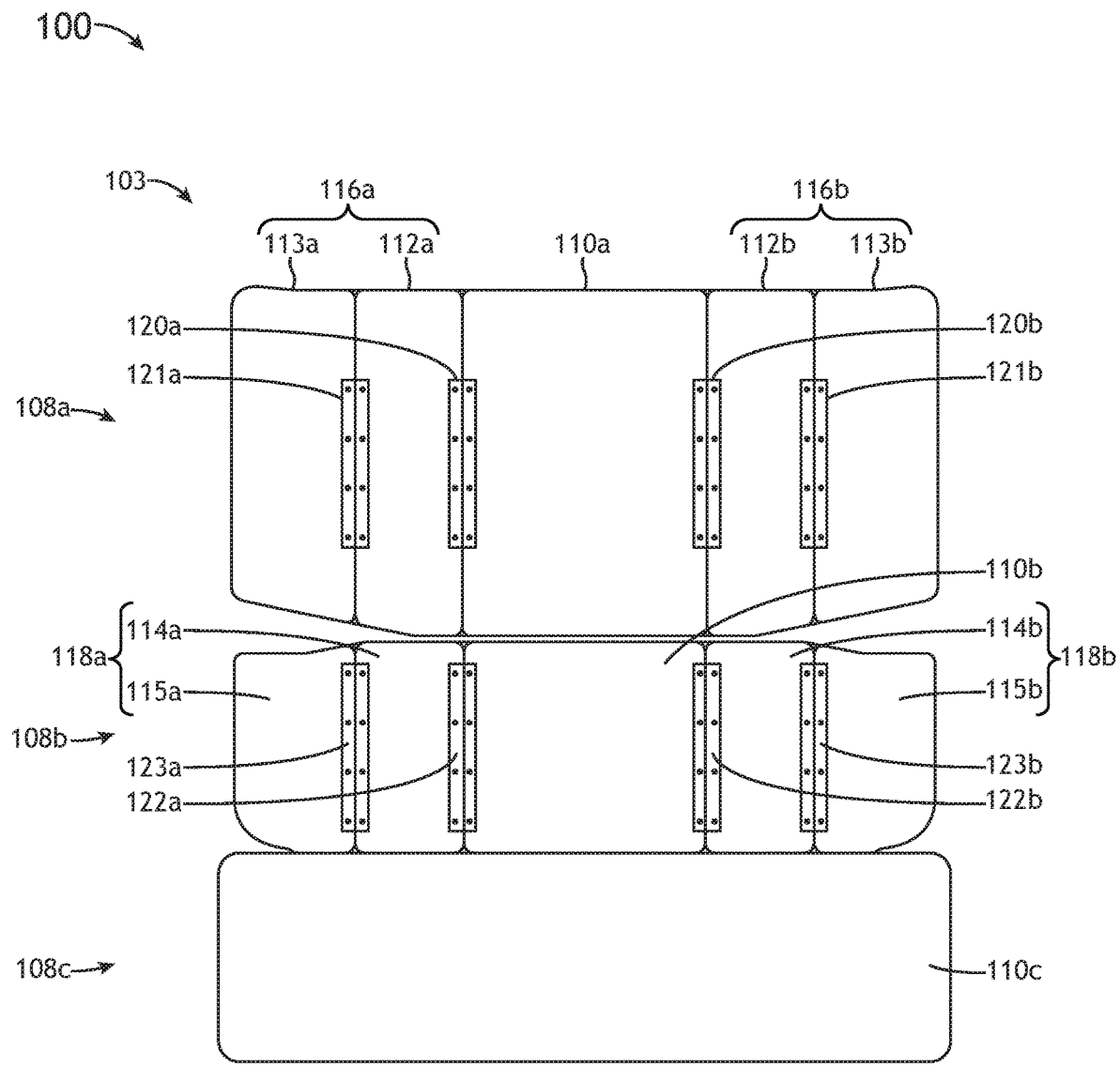
FIG. 2A illustrates a front elevation view of an aircraft passenger seat assembly, in accordance with one or more embodiments of the present disclosure.

FIG. 2A illustrates a front elevation view of an aircraft passenger seat assembly 100, in accordance with one or more embodiments of the present disclosure. In particular, FIG. 2A illustrates a seatback assembly 103 in an un-deployed (e.g., "flat") position.

In embodiments, the aircraft passenger seat assembly 100 may include a seatback assembly 103 including one or more lateral seatback sections 108a-108n. For example, the seatback assembly 103 may include a first lateral seatback section 108a, a second lateral seatback section 108b, and a third lateral seatback section 108. The one or more lateral seatback sections 108a-108n may be coupled to one another using any techniques known in the art. For example, the one or more lateral seatback sections 108a-108n may be pivotably coupled to one another via one or more hinges such that the lateral seatback sections 108a-108n may be selectively pivoted/rotated with respect to one another. By selectively actuating the one or more lateral seatback sections 108a-108n with respect to one another, the aircraft passenger seat assembly 100 may be configured to adjust a profile of the front seatback surface. In embodiments, the seatback assembly 103 may be disposed within the seatback 102 of an aircraft passenger seat 101 such that it is configured to support an upper body of a passenger. In embodiments, the seatback assembly 103 may be coupled to a seatback frame of the seatback 102a, 102b of the aircraft passenger seat 101a, 101b.

In embodiments, at least one lateral seatback section 108a-108c may be divided into a plurality of segmented seatback panels. In this regard, the seatback assembly 103 may be regarded as a staggered and/or multi-staged seatback assembly 103. For example, as shown in FIG. 2A, the first lateral seatback section 108a may include a base seatback panel 110a, a first set of one or more segmented seatback panels 112a, 112b, and a second set of one or more segmented seatback panels 113a, 113b. By way of another example, the second lateral seatback section 108b may include a base seatback panel 110b, a first set of one or more segmented seatback panels 114a, 114b, and a second set of one or more segmented seatback panels 115a, 115b.

In this regard, the first and second lateral seatback sections 108a, 108b may be regarded as including "lateral wing assemblies" (e.g., lateral wing assembly 116a, 116b, 118a, 118b) configured to support lateral sides of an upper body of a passenger, wherein the lateral wing assemblies 116a, 116b, 118a, 118b include multi-staged lateral wing assemblies 116a, 116b, 118a, 118b. For example, the first lateral seatback section 108a may include a first lateral wing assembly 116a coupled to a first lateral side of the base panel 110a, wherein the first lateral wing assembly 116a includes segmented seatback panels 112a, 113a and is configured to support a right lateral side of a passenger. Similarly, the first lateral seatback section 108a may include a second lateral wing assembly 116b coupled to a second lateral side of the base panel 110a opposite the first lateral side, wherein the second lateral wing assembly 116b includes segmented seatback panels 112b, 113b and is configured to support a left lateral side of a passenger. By way of another example, the second lateral seatback section 108b may include a first lateral wing assembly 118a including segmented seatback panels 114a, 115a configured to support a right lateral side of a passenger, and a second lateral wing assembly 118b including segmented seatback panels 114b, 115b which is configured to support a left lateral side of a passenger.

In embodiments, the lateral seatback sections 108a-108n may include any number of sets of segmented seatback panels. In this regard, each lateral wing assembly 116a, 116b, 118a, 118b of the lateral seatback sections 108a-108n may include any number of segmented seatback panels. For example, instead of each lateral wing assembly 116a, 116b, 118a, 118b including two separate segmented seatback panels, as shown in FIG. 2A, each lateral wing assembly 116a, 116b, 118a, 118b may instead include three, four, . . . N number of segmented seatback panels. For instance, the first lateral seatback section 108a may include at least one additional set of one or more segmented seatback panels coupled to the second set of segmented seatback panels 113a, 113b.

Furthermore, while each lateral each lateral wing assembly 116a, 116b, 118a, 118b is shown and described as including equivalent numbers of segmented seatback panels, this is not to be regarded as a limitation of the present disclosure, unless noted otherwise herein. For example, the first lateral seatback section 108a may include a first lateral wing assembly 116a and a second lateral wing assembly 116b, wherein the first lateral wing assembly 116a includes two separate segmented seatback panels and the second lateral wing assembly 116b includes three separate segmented seatback panels.

In embodiments, the base seatback panels 110a, 110b may be coupled to a seatback frame of the seatback 102 of the aircraft passenger seat 101. The base seatback panels 110a, 110b may be coupled to a seatback frame of the seatback 102 such that they are actuatable with respect to the seatback frame and/or stationary with respect to the seatback frame. The base seatback panels 110a, 110b may be disposed within the seatback assembly 103 such that they are centered along a vertical centerline of the seatback assembly 103 and seatback 102. However, while the first and second lateral seatback sections 108a, 108b are shown and described as each including a single base seatback panel 110a, 110b, this is not to be regarded as a limitation of the present disclosure, unless noted otherwise herein. In this regard, the first and second lateral seatback sections 108a, 108b may each include a plurality of base seatback panels. For example, the first lateral seatback section 108a may include a first base seatback panel and a second base seatback panel, wherein the first and second seatback panels are coupled together along the vertical centerline of the seatback assembly 103.

In some embodiments, one or more lateral seatback sections 108a-108n may not be divided into separate seatback panels. For example, as shown in FIG. 2A, the third lateral seatback section 108c may include a single base seatback panel 110c. The base seatback panel 110c may be coupled to the seatback frame, and may be configured to support the lower back of a passenger sitting upon the aircraft passenger seat 101.

In embodiments, the various seatback panels of the seatback assembly 103 may be coupled to one another. In particular, in some embodiments, the various seatback panels may be pivotably coupled to one another. For example, referring to the first lateral seatback section 108a, the first set of one or more segmented seatback panels 112a, 112b may be pivotably coupled to the base seatback panel 110a via a set of one or more pivoting assemblies 120a, 120b. By way of another example, the second set of one or more segmented seatback panels 113a, 113b may be pivotably coupled to the first set of one or more segmented seatback panels 112a, 112b via a set of one or more pivoting assemblies 121a, 121b. By way of another example, referring to the second lateral seatback section 108b, the first set of one or more segmented seatback panels 114a, 114b may be pivotably coupled to the base seatback panel 110b via a set of one or more pivoting assemblies 122a, 122b. By way of another example, the second set of one or more segmented seatback panels 115a, 115b may be pivotably coupled to the first set of one or more segmented seatback panels 114a, 114b via a set of one or more pivoting assemblies 123a, 123b.

The pivoting assemblies 120a-123b, may include any pivoting assemblies known in the art configured to pivot/rotate components with respect to one another. In this regard, the pivoting assemblies 120a-123b may include, but are not limited to, hinges (e.g., piano hinges, butt hinges, butterfly hinges, frog hinges, flush hinges, strap hinges, and the like).

Figure 2B:
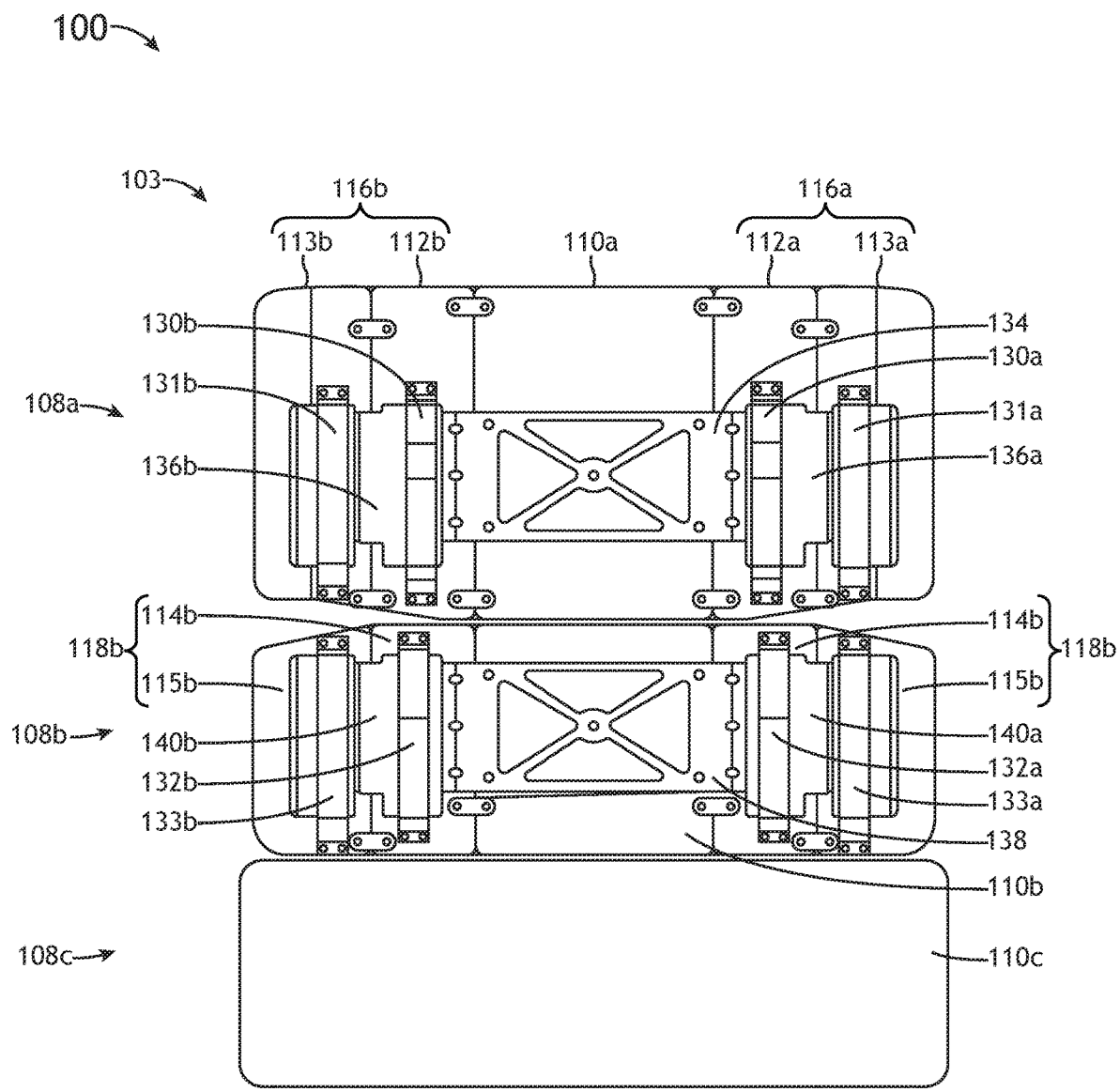
FIG. 2B illustrates a rear elevation view of an aircraft passenger seat, in accordance with one or more embodiments of the present disclosure.
Figure 2C:
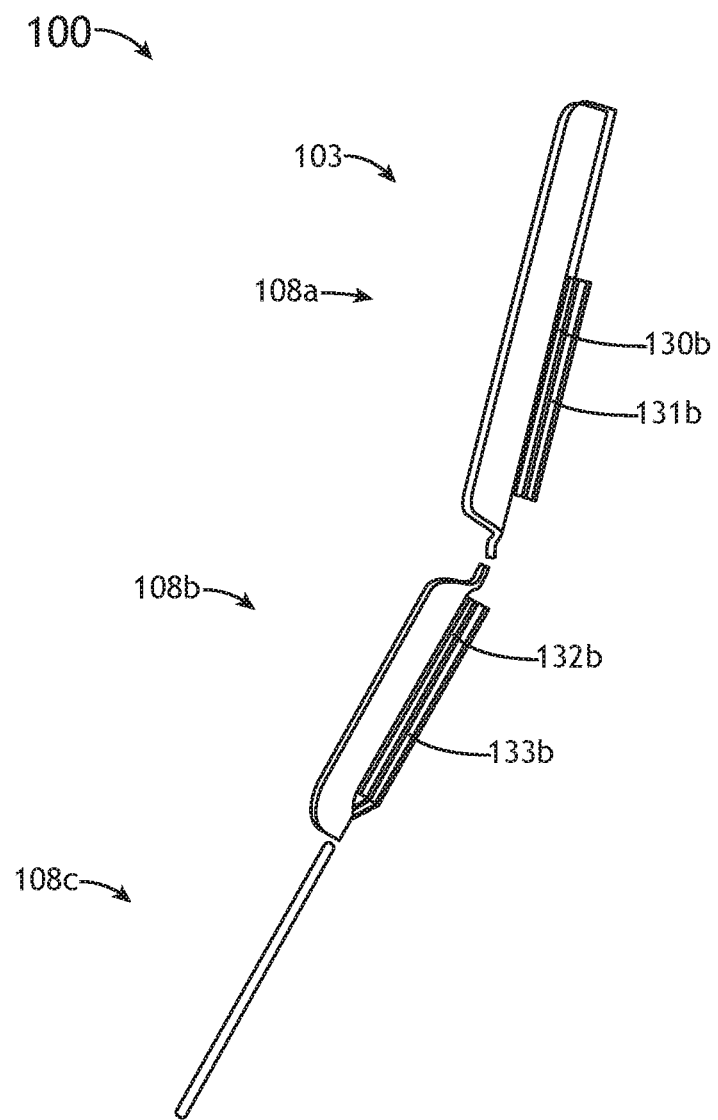
FIG. 2C illustrates a side elevation view of an aircraft passenger seat assembly, in accordance with one or more embodiments of the present disclosure.

FIG. 2B illustrates a rear elevation view of an aircraft passenger seat assembly 100, in accordance with one or more embodiments of the present disclosure. FIG. 2C illustrates a side elevation view of an aircraft passenger seat assembly 100, in accordance with one or more embodiments of the present disclosure. In embodiments, the aircraft passenger seat assembly 100 may include the seatback assembly 103 and a plurality of actuatable assemblies 130a, 130b, 131a, 131b, 132a, 132b, 133a, 133b.

In embodiments, the plurality of actuatable assemblies 130a-133n. may be configured so selectively actuate various seatback panels of the multi-staged seatback assembly 103 with respect to one another. In this regard, each lateral wing assembly 116a, 116b, 118a, 118b may include one or more sets of one or more actuatable assemblies 130a-133n configured to actuate the seatback panels of the respective lateral wing assembly 116a, 116b, 118a, 118b. In embodiments, the plurality of actuatable assemblies 130a-133n may be configured to selectively actuate the lateral wing assemblies 116a, 116b, 118a, 118b and/or the segmented seatback panels 112a, 112b, 113a, 114b between un-deployed (e.g., flat) positions and one or more deployed (e.g., curved, extended) positions.

For example, the first lateral seatback section 108a may include a first set of a first set of one or more actuatable assemblies 130a, 130b configured to selectively actuate the first set of one or more segmented seatback panels 112a, 112b relative to the base seatback panel 110a. Similarly, the first lateral seatback section 108a may further include a second set of one or more actuatable assemblies 131a, 131b configured to selectively actuate the second set of one or more segmented seatback panels 113a, 113b relative to the first set of one or more segmented seatback panels 112a, 112b. By way of another example, the second lateral seatback section 108b may include a first set of a first set of one or more actuatable assemblies 132a, 132b configured to selectively actuate the first set of one or more segmented seatback panels 114a, 114b relative to the base seatback panel 110b, and a second set of one or more actuatable assemblies 133a, 133b configured to selectively actuate the second set of one or more segmented seatback panels 115a, 115b relative to the first set of one or more segmented seatback panels 114a, 114b.

It is noted herein that the plurality of actuatable assemblies 130a-133n may include any actuatable assemblies known in the art configured to actuate components with respect to one another. For example, the plurality of actuatable assemblies 130a-133n may include, but are not limited to, a pneumatic bladder, a hydraulic apparatus, a spring apparatus, a mechanical actuator (e.g., motor, linear actuator, electric actuator), and the like. It is noted herein that pneumatic bladders may reduce the overall weight of the aircraft passenger seat assembly 100. Additionally, pneumatic bladders may facilitate passenger comfort by providing a degree of compression and cushioning.

The plurality of actuatable assemblies 130a-133n may be configured to selectively actuate various seatback panels with respect to one another in order to actuate components of the aircraft passenger seat assembly 100 between an un-deployed position and one or more deployed positions. In embodiments, the plurality of actuatable assemblies 130a-130n are coupled to one or more support members 134, 136, 138, 140. This may be further understood with reference to FIGS. 2D-2G.

Figure 2D:
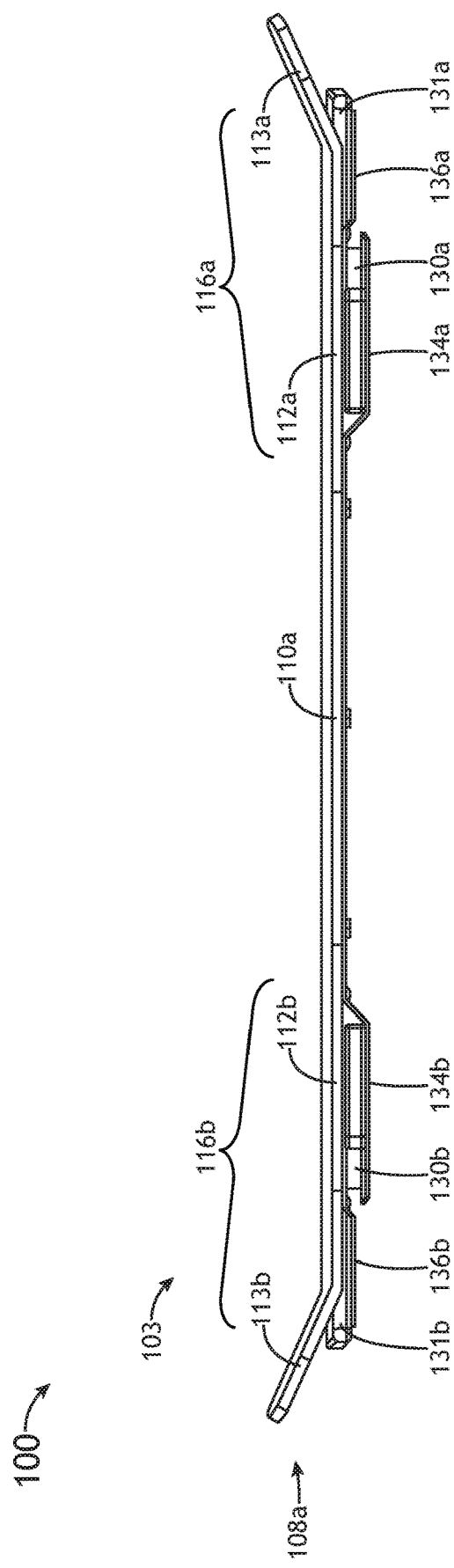
FIG. 2D illustrates a top perspective view of an aircraft passenger seat assembly, in accordance with one or more embodiments of the present disclosure.

FIG. 2D illustrates a top perspective view of an aircraft passenger seat assembly 100, in accordance with one or more embodiments of the present disclosure. In particular, FIG. 2D illustrates a first lateral seatback section 108a of a seatback assembly 103 with both lateral wing assemblies 116a, 116b in an un-deployed (e.g., "flat") position.

As noted previously herein, the plurality of actuatable assemblies 130a-133n may be configured to selectively actuate various seatback panels with respect to one another. For example, the first set of one or more actuatable assemblies 130a, 130b may be configured to selectively actuate (e.g., selectively pivot, selectively rotate) the first set of one or more segmented seatback panels 112a, 112b with respect to the base seatback panel 110a. Additionally, by way of another example, the second set of one or more actuatable assemblies 131a, 131b may be configured to selectively actuate (e.g., selectively pivot, selectively rotate) the second set of one or more segmented seatback panels 113a, 113b with respect to the first set of one or more segmented seatback panels 112a, 112b. By selectively actuating seatback panels at multiple points along a lateral seatback section 108a-108n, the seatback assembly 103 of the present disclosure may be regarded as a staggered and/or multi-stage seatback assembly 103.

In embodiments, the sets of actuatable assemblies (e.g., the first set of one or more actuatable assemblies 130a, 130b, the second set of one or more actuatable assemblies 131a, 131b) may be configured to selectively actuate respective seatback panels in tandem (e.g., simultaneously) and/or independently. For example, actuatable assembly 130a may be configured to selectively actuate the seatback panel 112a in tandem with the actuatable assembly 130b selectively actuating the seatback panel 112b. By way of another example, actuatable assembly 130a may be configured to selectively actuate the seatback panel 112a independently from the actuatable assembly 130b selectively actuating the seatback panel 112b. In this regard, a first lateral wing assembly 116a may be selectively actuated into a first deployed position, wherein a second lateral wing assembly 116b may be retained in an un-deployed position and/or actuated into a second deployed position different from the first deployed position.

In embodiments, selectively actuating seatback panels of the seatback assembly 103 may include selectively inducing offset angles between the respective seatback panels. This may be further understood with reference to FIG. 2E.

Figure 2E:
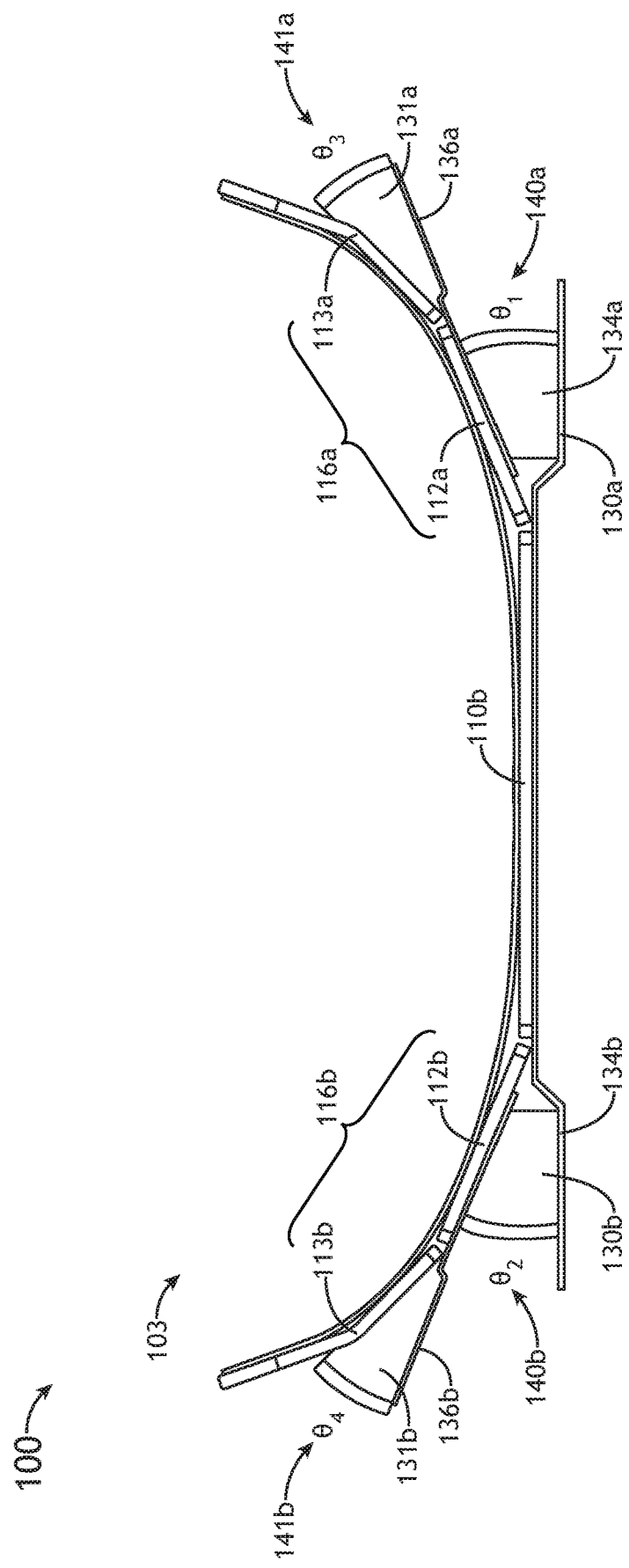
FIG. 2E illustrates a top perspective view of an aircraft passenger seat assembly, in accordance with one or more embodiments of the present disclosure.

FIG. 2E illustrates a top perspective view of an aircraft passenger seat assembly 100, in accordance with one or more embodiments of the present disclosure. In particular, FIG. 2D illustrates a first lateral seatback section 108a of a seatback assembly 103 with both lateral wing assemblies 116a, 116b in a deployed (e.g., "curved" or "extended") position.

In embodiments, the first set of one or more actuatable assemblies 130a, 130b are configured to selectively actuate the first set of one or more segmented seatback panels 112a, 112b relative to the base seatback panel 110a by selectively inducing a first set of offset angles 140a, 140b (e.g., $\theta_1$, $\theta_2$) between the first set of one or more segmented seatback panels 112a, 112b and the base seatback panel 110a. Offset angle 140a ($\theta_1$) may be defined as an angle between a plane of a surface of the base seatback panel 110a and a plane of a surface of the segmented seatback panel 112a. Similarly, offset angle 140b ($\theta_2$) may be defined as an angle between a plane of a surface of the base seatback panel 110a and a plane of a surface of the segmented seatback panel 112b.

Similarly, in some embodiments, the second set of one or more actuatable assemblies 131a, 131b are configured to selectively actuate the second set of one or more segmented seatback panels 113a, 113b relative to the first set of one or more segmented seatback panels 112a, 112b by selectively inducing a second set of offset angles 141a, 141b (e.g., $\theta_3$, $\theta_4$) between the second set of one or more segmented seatback panels 113a, 113b and the first set of one or more segmented seatback panels 112a, 112b. Offset angle 141a ($\theta_3$) may be defined as an angle between a plane of a surface of the segmented seatback panel 112a and a plane of a surface of the segmented seatback panel 113a. Similarly, offset angle 141b ($\theta_4$) may be defined as an angle between a plane of a surface of the segmented seatback panel 112b and a plane of a surface of the segmented seatback panel 113b.

It is noted herein that selectively inducing offset angles at multiple points along the various lateral seatback sections 108a-108n may provide a more natural, comfortable seatback 102 for aircraft passengers than if these offset angles were induced at a single point. For example, consider a seatback 102 which includes a base seatback panel and a single lateral seatback panel on each lateral side of the base seatback panel. If it were desired to have 45° lateral "wings" of the seatback 102, each lateral seatback panel would have to be positioned at a 45° angle with respect to the base seatback panel. However, such sharp angles of the seatback 102 have been found to be uncomfortable and unnatural for aircraft passengers, as the sharp angles crowd the shoulders of the aircraft passengers.

Conversely, consider the same 45° angle using the aircraft passenger seat assembly 100 of the present disclosure. In order to induce a total 45° offset angle between the middle portion of an aircraft passenger seat 101 (e.g., base seatback panel 110a) and the lateral sides (e.g., segmented seatback panels 113a, 113b), the first set of actuatable assemblies 130a, 130b may selectively induce a first set of offset angles 140a, 140b (e.g., $\theta_1$, $\theta_2$) between the first set of segmented seatback panels 112a, 112b and the base seatback panel 110a, wherein the first set of offset angles 140a, 140b are each 22.5° (e.g., $\theta_1$=22.5°, $\theta_2$=22.5°). Similarly, the second set of actuatable assemblies 131a, 131b may selectively induce a first set of offset angles 141a, 141b (e.g., $\theta_3$, $\theta_4$) between the second set of segmented seatback panels 113a, 113b and the first set of segmented seatback panels 112a, 112b, wherein the second set of offset angles 141a, 141b are each 22.5° (e.g., $\theta_3$=22.5°, $\theta_4$=22.5°).

In this example, the total offset angle between the middle portion of the aircraft passenger seat 101 (e.g., base seatback panel 110a) and the lateral sides (e.g., segmented seatback panels 113a, 113b) is 45°. By spreading out the total offset angle at multiple points along the seatback assembly 103, the aircraft passenger seat assembly 100 may avoid sharp, uncomfortable transitions, and provide a more natural, smooth, and supportive front seatback surface to support the upper body of a passenger. It is noted herein hat the plurality of actuatable assemblies 130, 131, 132, 133 may be selectively actuated on a bespoke basis in order to adjust a profile of the front seatback surface of the seatback 102 according to each passenger's preferences and support requirements.

As noted previously herein, the plurality of actuatable assemblies 130, 131, 132, 133 may be actuated in tandem and/or independently. In this regard, it is noted herein that the various offset angles 140a, 140b, 141a, 141b need not be equivalent. For example, offset angle 140a may be the equivalent to offset angle 140b (e.g., $\theta_1$=$\theta_2$). By way of another example, offset angle 140a may not be the equivalent to offset angle 140b (e.g., $\theta_1 \neq \theta_2$). For instance, a passenger may wish to only deploy only the first lateral wing assembly 116a such that offset angle 140a is not equivalent to offset angle 140b (e.g., $\theta_1 \neq \theta_2$). Similarly, offset angle 1401a may be the equivalent to offset angle 141b (e.g., $\theta_3$=$\theta_4$) in some configurations, and not equivalent in other configurations (e.g., $\theta_3 \neq \theta_4$).

It is noted herein that the plurality of actuatable assemblies 130, 131, 132, 133 may be selectively actuated via any techniques known in the art. For example, the plurality of actuatable assemblies 130, 131, 132, 133 may be communicatively coupled to a controller and/or processing components such that a passenger may be able to transmit electronic input commands (e.g., wired and/or wireless communication signals) in order to cause the plurality of actuatable assemblies 130, 131, 132, 133 to selectively actuate. For instance, the aircraft passenger seat 101 may include a user interface configured to receive input commands from a user (e.g., passenger). The user interface may include any user interface known in the art including, but not limited to, a touchscreen, a plurality of buttons, a joystick, and the like.

By way of another example, the plurality of actuatable assemblies 130, 131, 132, 133 may be mechanically actuated. For example, a passenger may be able to manually exert outside forces on the lateral wing assemblies 116a, 116b, 118a, 118b by pushing and/or pulling the 116a, 116b, 118a, 118b. For instance, the plurality of actuatable assemblies 130, 131, 132, 133 may include hydraulic assemblies, wherein outside forces exerted by a user/passenger are configure to cause the plurality of actuatable assemblies 130, 131, 132, 133 (e.g., hydraulic assemblies) to deploy or un-deploy the lateral wing assemblies 116a, 116b, 118a, 118b.

It is noted herein that the plurality of actuatable assemblies 130, 131, 132, 133 may be configured to actuate or not actuate dependent upon the outside force exerted on the lateral wing assemblies 116a, 116b, 118a, 118b relative to a force threshold value. For example, a user/passenger may be configured to deploy the lateral wing assemblies 116a, 116b, 118a, 118b by pulling on the lateral wing assemblies 116a, 116b, 118a, 118b, wherein the pulling outside force exceeds a deployment force threshold value. Once deployed, the plurality of actuatable assemblies 130, 131, 132, 133 may be configured to resist outside forces less than an un-deployment force threshold value. By resisting outside forces under an un-deployment force threshold value, the plurality of actuatable assemblies 130, 131, 132, 133 may be able to remain deployed (as shown in FIG. 2E) against relatively small forces exerted by a passenger leaning against the lateral wing assemblies 116a, 116b, 118a, 118b. Subsequently, the passenger may wish to return the seatback assembly 103 to an un-deployed state. In this example, the passenger may push on the lateral wing assemblies 116a, 116b, 118a, 118b, thereby exerting an outside force which is greater than the un-deployment force threshold value. Because the pushing force exceeds the un-deployment force threshold value, the plurality of actuatable assemblies 130, 131, 132, 133 may be configured to selectively actuate and allow the lateral wing assemblies 116a, 116b, 118a, 118b to return to an un-deployed state (shown in FIG. 2D.

In embodiments, the aircraft passenger seat assembly 100 may further include one or more support members 134, 136, 138, 140. For example, as shown in FIG. 2B, the first lateral seatback section 108 may include support members 134, 136, the second lateral seatback section 108 may include support members 138, 140. As shown in FIGS. 2D and 2E, the support members 124, 136, 138, 140 may be coupled to the base seatback panels 110a, 110b, the various segmented seatback panels 112, 113, and the plurality of actuatable assemblies 130, 131, 132, 133.

In embodiments, the one or more support members 124, 136, 138, 140 may facilitate actuation of the segmented support panels 112, 113 via the plurality of actuatable assemblies 130, 131, 132, 133. In particular, the plurality of actuatable assemblies 130, 131, 132, 133 may be configured to actuate the respective segmented support panels 112, 113 by actuating the support panels 112, 113 relative to the support members support members 124, 136, 138, 140, or vis versa.

For example, referring to FIG. 2D, the aircraft passenger seat assembly 100 may include a support members 134a, 134b coupled to the base seatback panel 110a. It is contemplated herein that the support members 134a, 134b may include a single support member 134 (as shown in FIG. 2) or separate, independent support members 134a, 134b. The first set of actuatable assemblies 130a, 130b may be coupled to the support members 134a, 134b and the first set of segmented seatback panels 112a, 112b. For instance, the actuatable assembly 130a may be coupled to the support member 134a and the segmented seatback panel 112a, and the actuatable assembly 130b may be coupled to the support member 134b and the segmented seatback panel 112b. In this example, the first set of actuatable assemblies 130a, 130b may be configured to selectively actuate the first set of segmented seatback panels 112a, 112b relative to the base seatback panel 110a by selectively inducing offset angles between the segmented seatback panels 112a, 112b and the one or more support members 134a, 134b. For instance, first set of actuatable assemblies 130a, 130b may be configured to selectively actuate the first set of segmented seatback panels 112a, 112b relative to the base seatback panel 110a by selectively actuating the segmented seatback panels 112a, 112b and with respect to (e.g., relative to) the one or more support members 134a, 134b.

By way of another example, referring to FIG. 2D, the aircraft passenger seat assembly 100 may include a support members 136a, 136b coupled to the segmented seatback panels 112a, 112b. The second set of actuatable assemblies 131a, 131b may be coupled to the support members 136a, 136b and the second set of segmented seatback panels 113a, 113b. For instance, the actuatable assembly 131a may be coupled to the support member 136a and the segmented seatback panel 113a, and the actuatable assembly 131b may be coupled to the support member 136b and the segmented seatback panel 113b. In this example, the second set of actuatable assemblies 131a, 131b may be configured to selectively actuate the second set of segmented seatback panels 113a, 113b relative to first set of segmented seatback panels 112a, 112b by selectively inducing offset angles between the second set of segmented seatback panels 113a, 113b and the one or more support members 136a, 136b. For instance, the second set of actuatable assemblies 131a, 131b may be configured to selectively actuate the second set of segmented seatback panels 113a, 113b relative to the first set of segmented seatback panels 112a, 112b by selectively actuating the second set of segmented seatback panels 113a, 113b and with respect to (e.g., relative to) the one or more support members 136a, 136b.

Figure 2F:
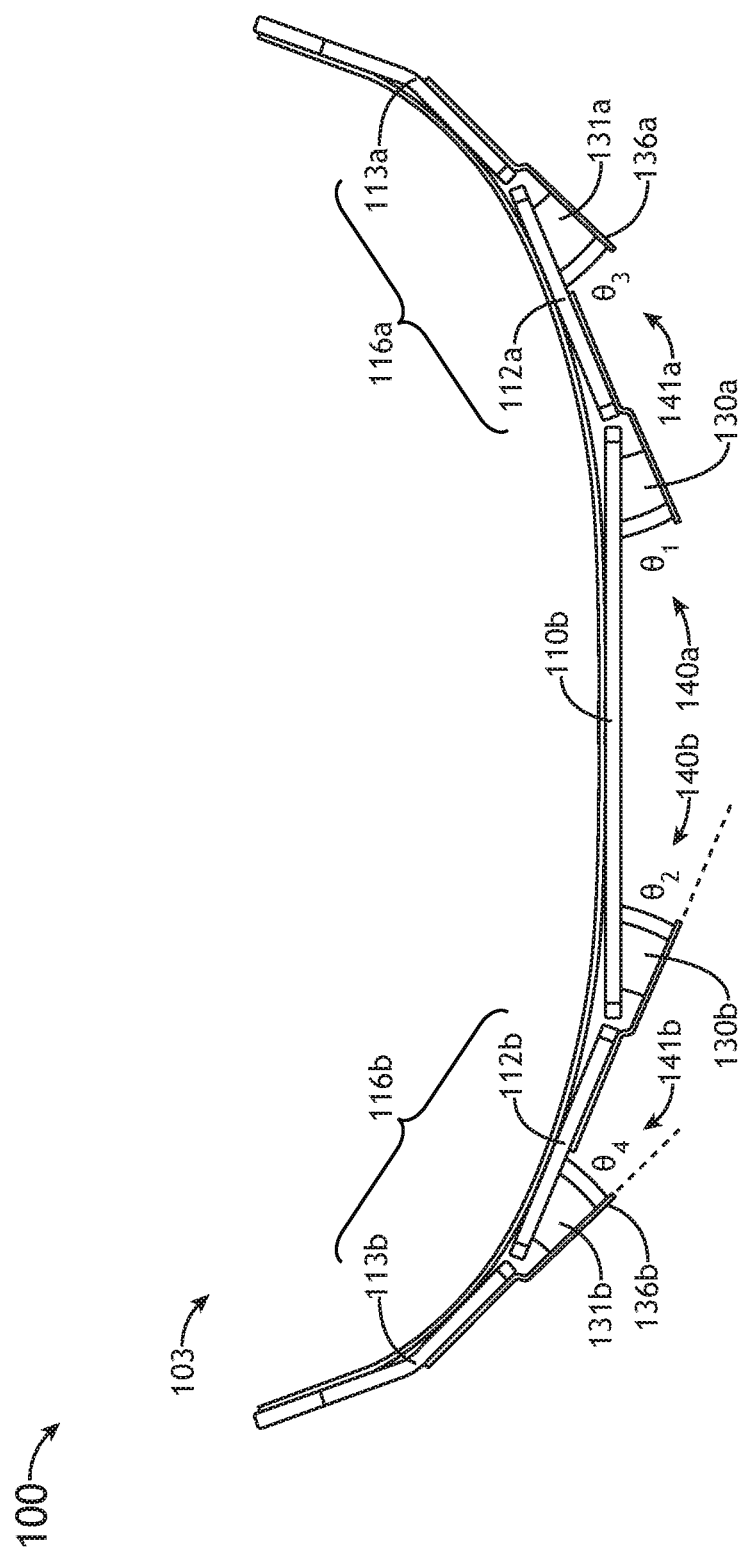
FIG. 2F illustrates a top perspective view of an aircraft passenger seat assembly, in accordance with one or more embodiments of the present disclosure.

FIG. 2F illustrates a top perspective view of an aircraft passenger seat assembly 100, in accordance with one or more embodiments of the present disclosure. In particular, FIG. 2D illustrates a first lateral seatback section 108a of a seatback assembly 103 with both lateral wing assemblies 116a, 116b in a deployed (e.g., "curved" or "extended") position.

FIG. 2F illustrates one potential alternative arrangement of the support members 134, 136 used to facilitate actuation of the segmented seatback panels 112, 113.

For example, referring to FIG. 2F, the aircraft passenger seat assembly 100 may include a support members 134a, 134b coupled to the first set of one or more segmented seatback panels 112a, 112b. The first set of actuatable assemblies 130a, 130b may be coupled to the support members 134a, 134b and the base seatback panel 110a. For instance, the actuatable assembly 130a may be coupled to the support member 134a and the base seatback panel 110a, and the actuatable assembly 130b may be coupled to the support member 134b and the base seatback panel 110b. In this example, the first set of actuatable assemblies 130a, 130b may be configured to selectively actuate the first set of segmented seatback panels 112a, 112b relative to the base seatback panel 110a by selectively inducing offset angles between the base seatback panel 110a and the one or more support members 134a, 134b. For instance, the first set of actuatable assemblies 130a, 130b may be configured to selectively actuate the first set of segmented seatback panels 112a, 112b relative to the base seatback panel 110a by selectively actuating the one or more support members 134a, 134b with respect to (e.g., relative to) the base seatback panel 110a.

By way of another example, referring to FIG. 2F, the aircraft passenger seat assembly 100 may include a support members 136a, 136b coupled to the second set of segmented seatback panels 113a, 113b. The second set of actuatable assemblies 131a, 131b may be coupled to the support members 136a, 136b and the first set of segmented seatback panels 112a, 112b. For instance, the actuatable assembly 131a may be coupled to the support member 136a and the segmented seatback panel 112a, and the actuatable assembly 131b may be coupled to the support member 136b and the segmented seatback panel 112b. In this example, the second set of actuatable assemblies 131a, 131b may be configured to selectively actuate the second set of segmented seatback panels 113a, 113b relative to first set of segmented seatback panels 112a, 112b by selectively inducing offset angles between the first set of segmented seatback panels 112a, 112b and the one or more support members 136a, 136b. For instance, the second set of actuatable assemblies 131a, 131b may be configured to selectively actuate the second set of segmented seatback panels 113a, 113b relative to the first set of segmented seatback panels 112a, 112b by selectively actuating the one or more support members 136a, 136b with respect to (e.g., relative to) the first set of segmented seatback panels 112a, 112b.

Figure 2G:
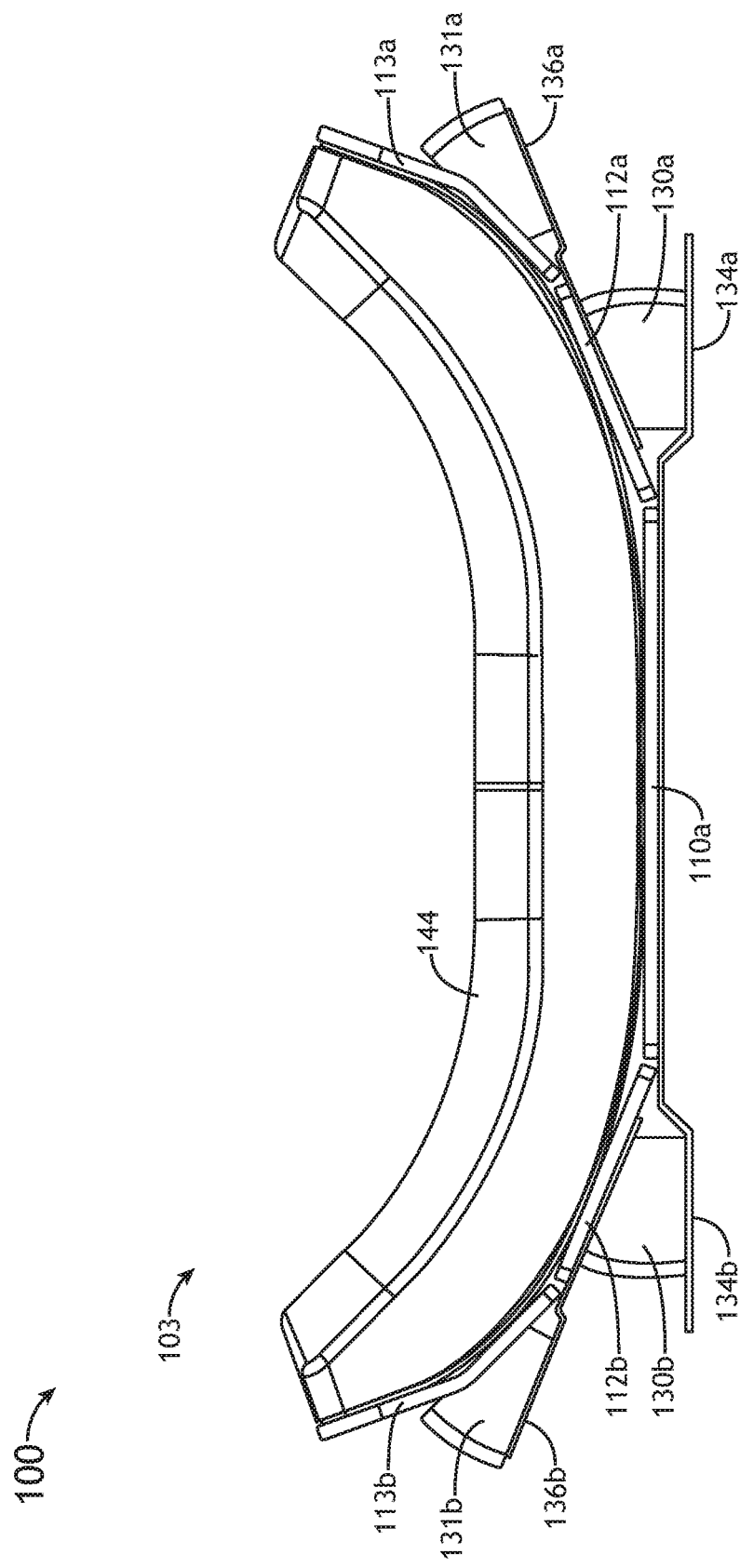
FIG. 2G illustrates a top perspective view of an aircraft passenger seat assembly, in accordance with one or more embodiments of the present disclosure.

FIG. 2G illustrates a top perspective view of an aircraft passenger seat assembly 100, in accordance with one or more embodiments of the present disclosure. In particular, FIG. 2D illustrates a first lateral seatback section 108a of a seatback assembly 103 with both lateral wing assemblies 116a, 116b in a deployed (e.g., "curved" or "extended") position.

In embodiments, the aircraft passenger seat assembly 100 may include one or more cushions 144 disposed on a front seatback surface of the seatback assembly 103 and seatback 102. In some embodiments, the one or more cushions 144 may include one or more cushions 144a-144n which substantially correspond to the various panels (e.g., base seatback panel 110, segmented seatback panels 112a, 112b, 113a, 113b) such that the one or more cushions 144a-144n substantially conform to the profile of the front seatback surface when the seatback assembly 103 is in the deployed or un-deployed position. In additional and/or alternative embodiments, the one or more cushions 144 may include one or more flexible cushions 144a-144n which are configured to substantially conform to the profile of the front seatback surface when the seatback assembly 103 is in the deployed or un-deployed position.

Figure 3A:
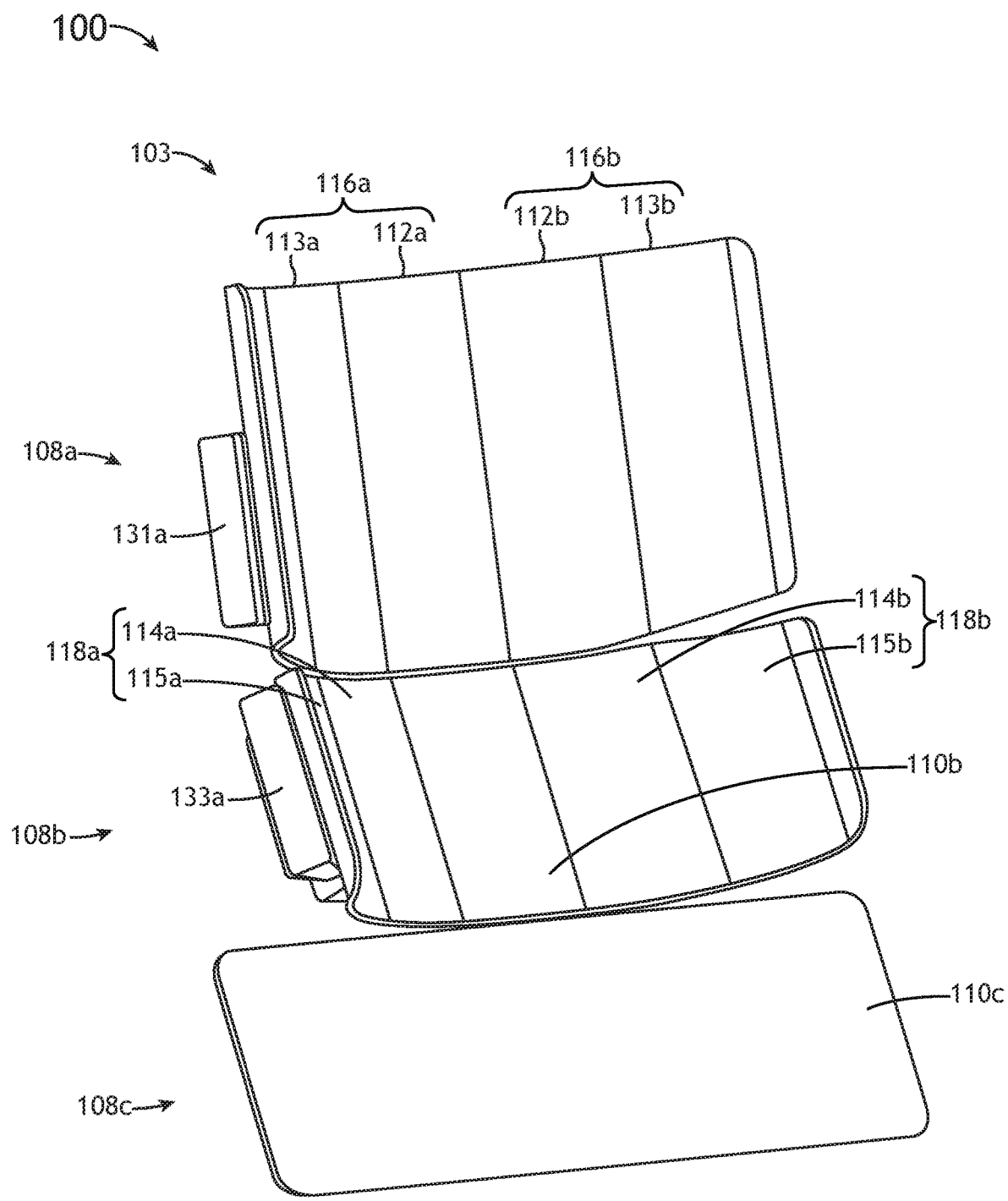
FIG. 3A illustrates a front perspective view of an aircraft passenger seat assembly, in accordance with one or more embodiments of the present disclosure.

FIG. 3A illustrates a front perspective view of an aircraft passenger seat assembly 100, in accordance with one or more embodiments of the present disclosure. In particular, FIG. 2D illustrates a plurality of lateral seatback sections 108a, 108b of a seatback assembly 103 with lateral wing assemblies 116a, 116b. 118a, 118b in a deployed (e.g., "curved" or "extended") position.

Figure 3B:
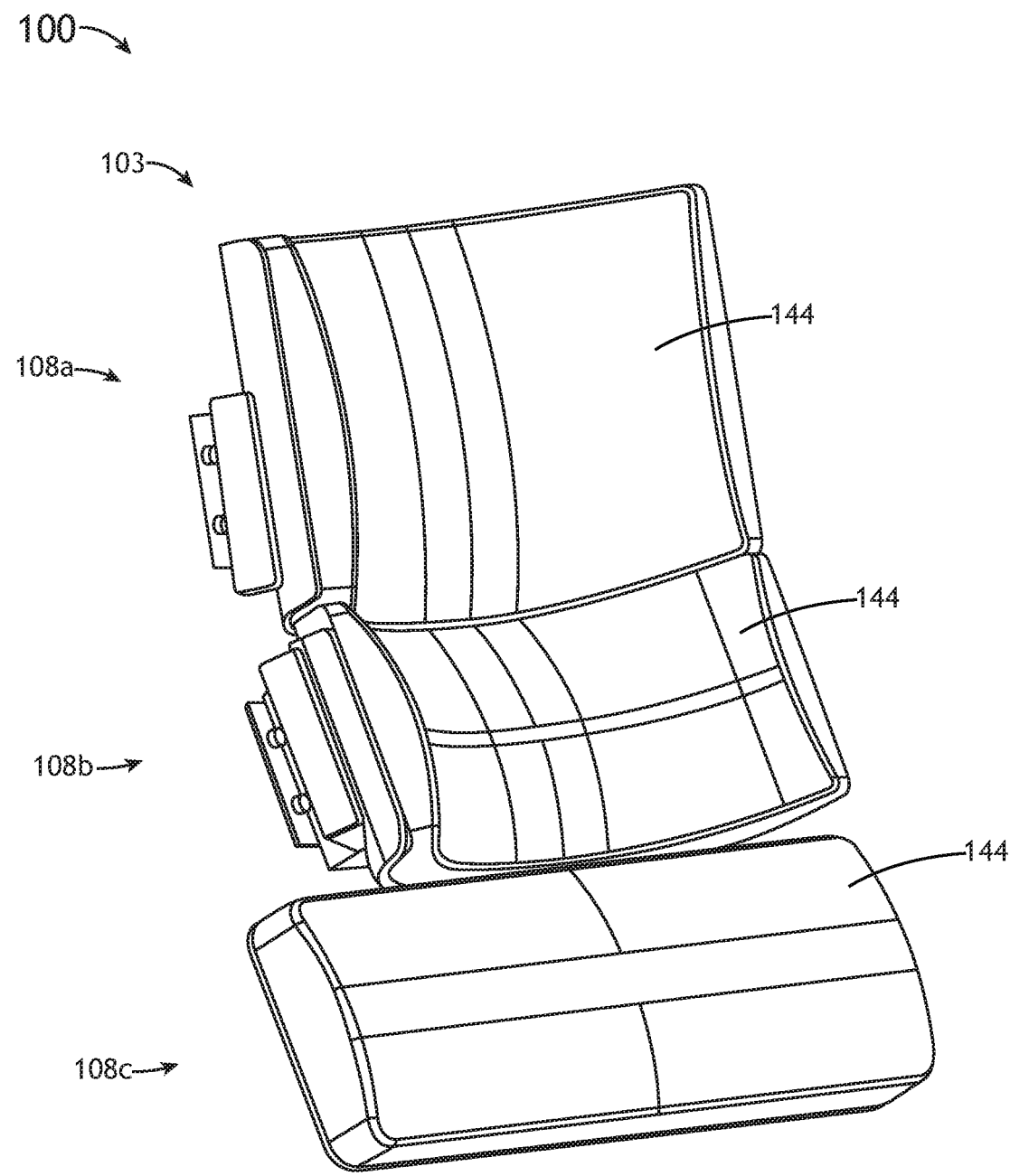
FIG. 3B illustrates a front perspective view of an aircraft passenger seat assembly including a plurality of cushions, in accordance with one or more embodiments of the present disclosure.

FIG. 3B illustrates a front perspective view of an aircraft passenger seat assembly 100 including a plurality of cushions 144, in accordance with one or more embodiments of the present disclosure. In particular, FIG. 2D illustrates a plurality of lateral seatback sections 108a, 108b of a seatback assembly 103 with lateral wing assemblies 116a, 116b. 118a, 118b in a deployed (e.g., "curved" or "extended") position.

Figure 3C:
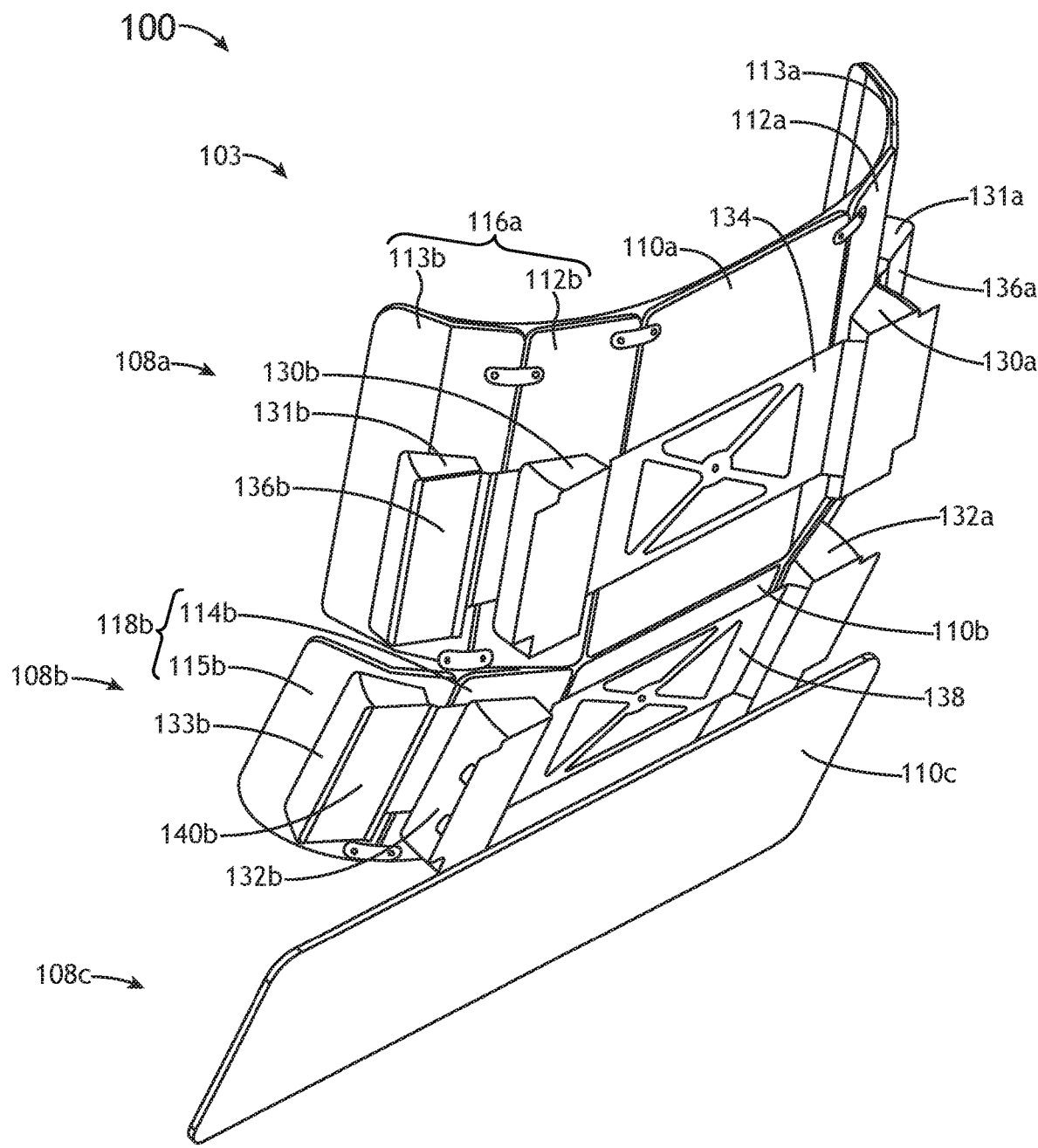
FIG. 3C illustrates a rear perspective view of an aircraft passenger seat assembly, in accordance with one or more embodiments of the present disclosure.

FIG. 3C illustrates a rear perspective view of an aircraft passenger seat assembly 100, in accordance with one or more embodiments of the present disclosure. In particular, FIG. 2D illustrates a plurality of lateral seatback sections 108a, 108b of a seatback assembly 103 with lateral wing assemblies 116a, 116b. 118a, 118b in a deployed (e.g., "curved" or "extended") position.

Figure 4A:
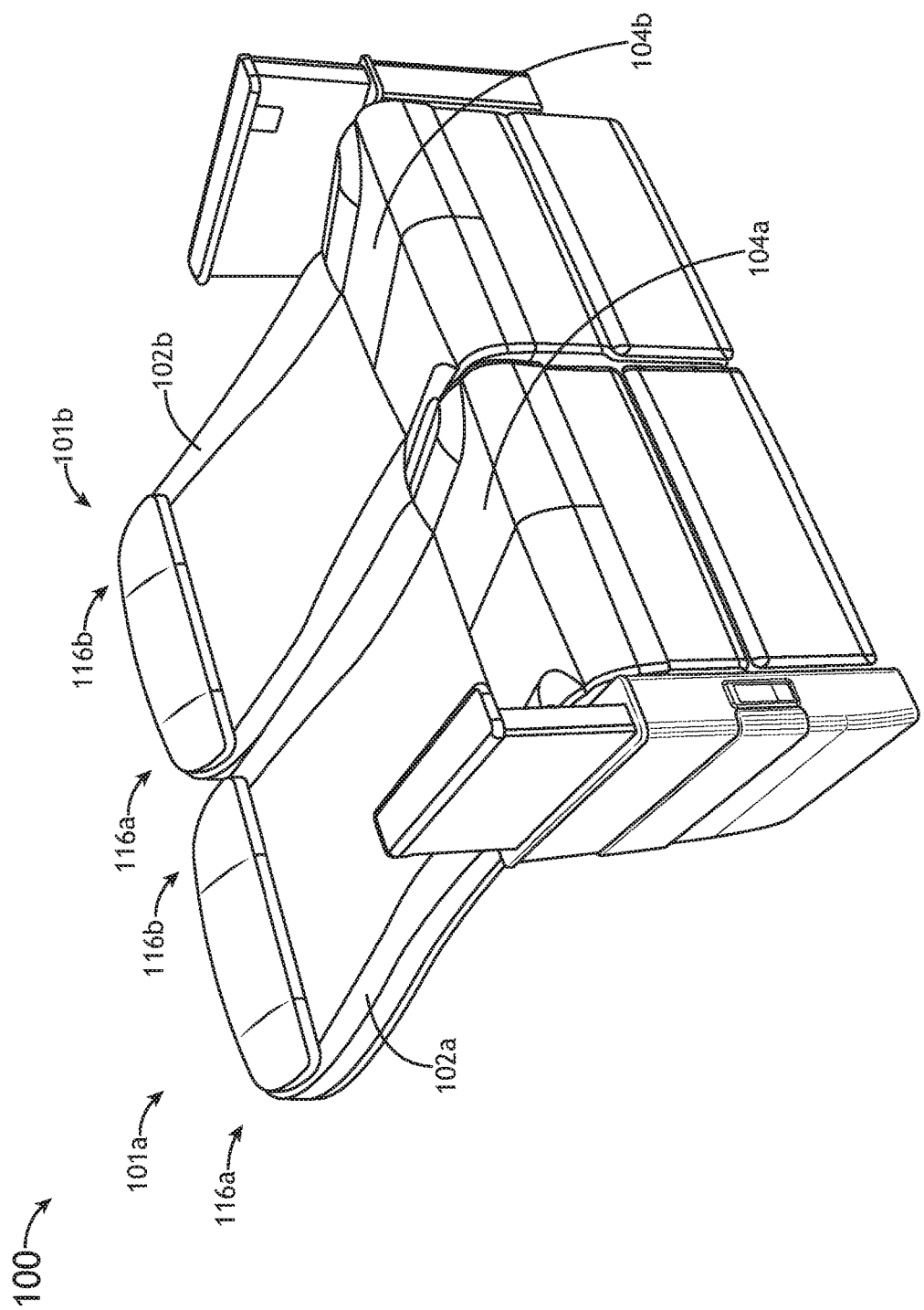
FIG. 4A illustrates a front perspective view of aircraft passenger seats in a reclined position, in accordance with one or more embodiments of the present disclosure.

FIG. 4A illustrates a front perspective view of aircraft passenger seats in a reclined position, in accordance with one or more embodiments of the present disclosure.

As noted previously herein, the seatbacks 102a, 102b of aircraft passenger seats 101a, 101b may be pivotably coupled to the seat structure 104a, 104b. In this regard, the seatback 102a, 102b may be configured to be selectively actuated and/or pivoted with respect to the seat structure 104a, 104b. For example, as shown in FIGS. 1 and 4A, the seatback 102a may be selectively actuated (e.g., pivoted) between an upright position (FIG. 1) and at least one reclined position (FIG. 4A). For instance, FIG. 4A illustrates the aircraft passenger seats 101a, 101b in a fully reclined position, in which the seatbacks 102a, 102b are substantially parallel to the seat structures 104a, 104b. As shown in FIG. 4A, the seatbacks 103a, 103b may be actuated to a fully reclined position in order to transform the aircraft passenger seats 101a, 101b into bed-like structures.

In some embodiments, the lateral wing assemblies 116a, 116b, 118a, 118b may be configured to be in an un-deployed (e.g., flat) position when the aircraft passenger seats 101a, 101b are in the fully reclined position. For example, as shown in FIG. 4A, the lateral wing assemblies 116a, 116b of the first aircraft passenger seat 101a and the second aircraft passenger seat 101b may be in the un-deployed position when the aircraft passenger seats 101a, 101b are in the fully reclined position.

Figure 4B:
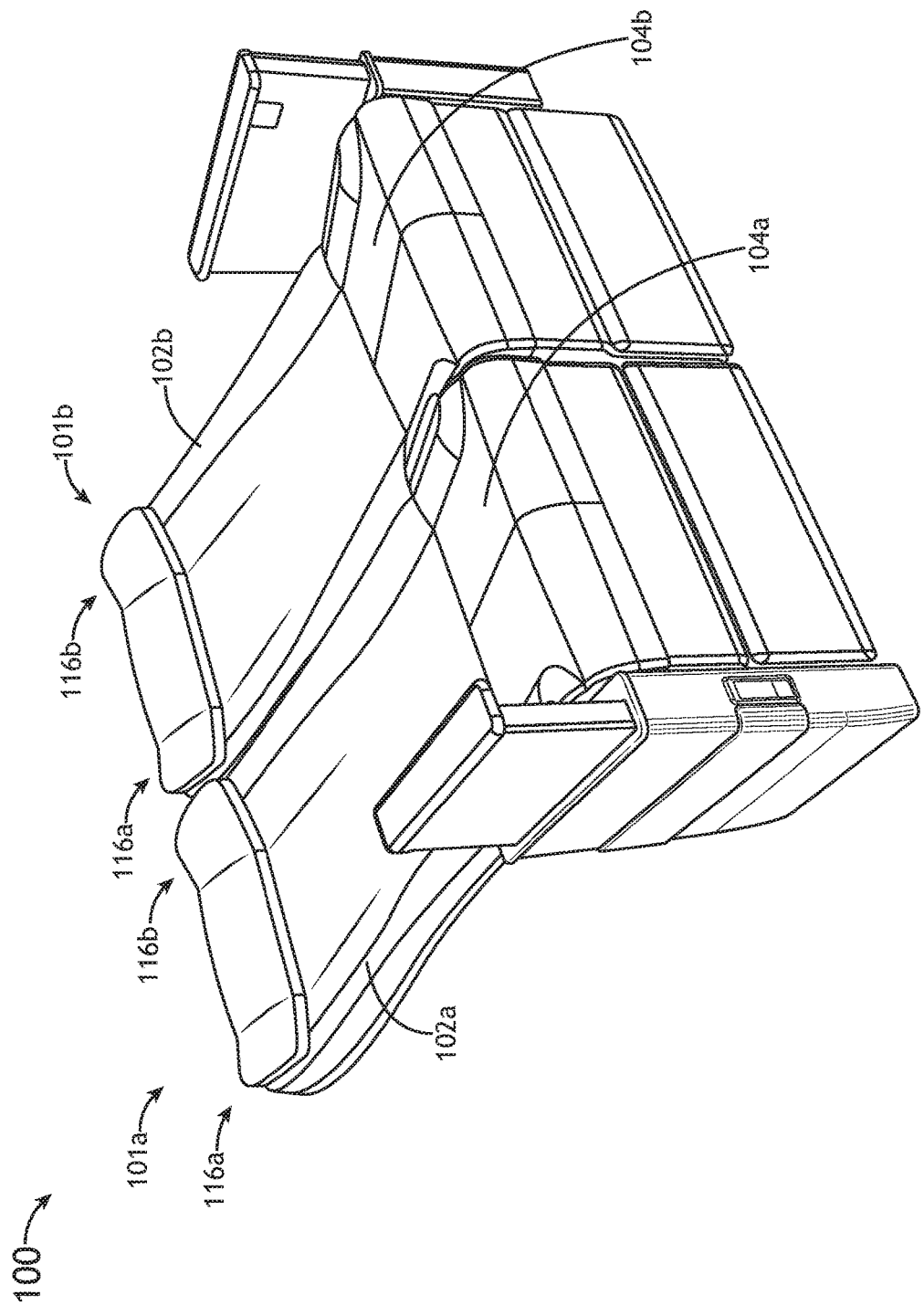
FIG. 4B illustrates a front perspective view of aircraft passenger seats in a reclined position, in accordance with one or more embodiments of the present disclosure.

In additional and/or alternative embodiments, the lateral wing assemblies 116a, 116b, 118a, 118b may be configured to be in a deployed (e.g., curved, extended) position when the aircraft passenger seats 101a, 101b are in the fully reclined position. For example, as shown in FIG. 4B, the lateral wing assemblies 116a, 116b of the first aircraft passenger seat 101a and the second aircraft passenger seat 101b may each be in the deployed position when the aircraft passenger seats 101a, 101b are in the fully reclined position. By deploying the lateral wing assemblies 116a, 116b, each aircraft passenger seat 101a, 101b may provide a "cradling" effect to support the passenger laying down, and retain the passenger in place.

Figure 4C:
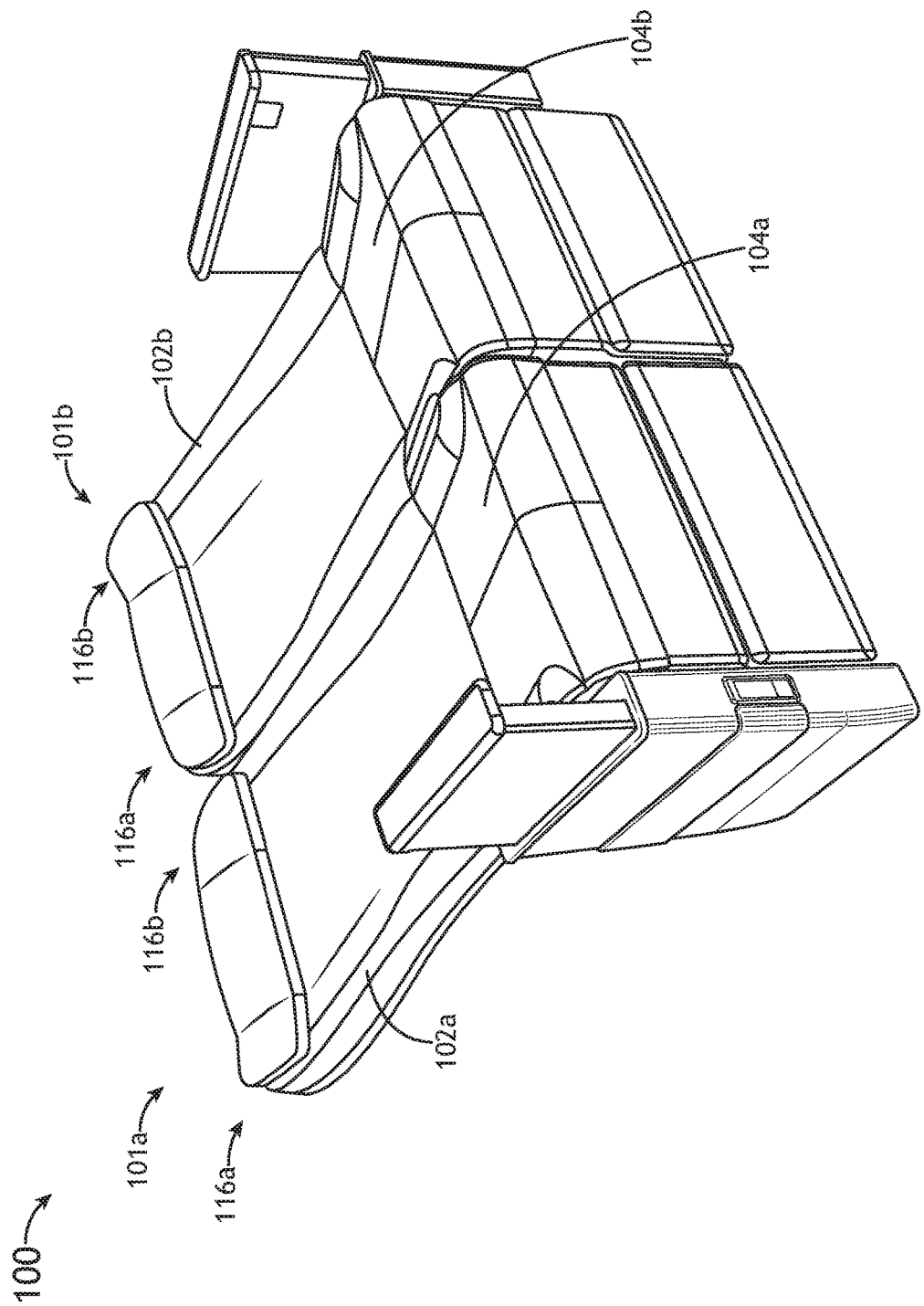
FIG. 4C illustrates a front perspective view of aircraft passenger seats in a reclined position, in accordance with one or more embodiments of the present disclosure.

In additional and/or alternative embodiments, the lateral wing assemblies 116a, 116b, 118a, 118b of adjacent seats may be configured to work in tandem with one another in order to provide additional and/or customized seating/laying positions. For example, as shown in FIG. 4C, in a fully reclined position, the first lateral wing assembly 116a of the first aircraft passenger seat 101a and the second lateral wing assembly 116b of the second aircraft passenger seat 101b may be in the deployed position, wherein the second lateral wing assembly 116b of the first aircraft passenger seat 101a and the first lateral wing assembly 106a of the second aircraft passenger seat 101b may be in the un-deployed position. As shown in FIG. 4C, selectively actuating the lateral wing assemblies 106a, 106b of adjacent aircraft passenger seats 101a, 101b in such a configuration may create a larger bed structure with only the outer edges (e.g., outer segmented seatback panels) curved upwards to retain the passengers in place.

Although example embodiments of the present disclosure are shown and described in an aircraft environment, the inventive concepts of the present disclosure may be configured to operate in alternative and/or additional contexts, unless noted otherwise herein. In this regard, the aircraft passenger seat assembly 100 may instead may be installed and/or configured or dimensioned to fit on any seat of any type of vehicle known in the art that has seats which are positioned in front of one another. For example, the aircraft passenger seat assembly 100 (more generally "seat assembly 100") may be implemented into the seats of any air, land, or water-based personal equipment or vehicle; any air, land, or water-based commercial equipment or vehicle (e.g., busses, trains, subways); any air, land, or water-based military equipment or vehicle known in the art. Additionally, it is noted herein the seat apparatus 100 of the present disclosure may be installed and/or configured or dimensioned to fit on any seat within a home or a business. For example, the seat assembly 100 may be installed and/or configured or dimensioned to fit on a seat in auditoriums, movie theatres, sports venues (e.g., baseball parks, arenas, or other venues having installed seats, or the like), where the seats are arranged in front of one other. Therefore, the above description should not be interpreted as a limitation on the disclosure but merely an illustration.

It is further noted herein that, where the environment includes an aircraft environment, it is noted herein the embodiments of aircraft passenger seat apparatus 100 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An aircraft passenger seat assembly, comprising:
  a seatback assembly including one or more lateral seatback sections, wherein at least one lateral seatback section comprises:
    a base seatback panel coupled to a seatback frame;
    a first set of one or more segmented seatback panels coupled to the base seatback panel; and
    a second set of one or more segmented seatback panels coupled to the first set of one or more segmented seatback panels;
  a plurality of actuatable assemblies, the plurality of actuatable assemblies comprising:
    a first set of one or more actuatable assemblies configured to selectively actuate the first set of one or more segmented seatback panels relative to the base seatback panel; and
    a second set of one or more actuatable assemblies configured to selectively actuate the second set of one or more segmented seatback panels relative to the first set of one or more segmented seatback panels
wherein the first set of one or more segmented seatback panels comprise a first lateral wing assembly, and the second set of one or more segmented seatback panels comprise a second lateral wing assembly,
wherein the first lateral wing assembly and the second lateral wing assembly are configured to deploy responsive to a user exerting a pulling force that exceeds a deployment force threshold value,
wherein the first lateral wing assembly and the second lateral wing assembly are configured to return to an un-deployed state responsive to a user exerting a pushing force that exceeds an un-deployment force threshold value.

2. The aircraft passenger seat assembly of claim 1,
wherein selectively actuating the first set of one or more segmented seatback panels relative to the base seatback panel comprises inducing a first set of offset angles between the first set of one or more segmented seatback panels and the base seatback panel, and
wherein selectively actuating the second set of one or more segmented panels relative to the first set of one or more segmented panels comprises inducing a second set of offset angles between the second set of one or more segmented panels relative to the first set of one or more segmented panels.

3. The aircraft passenger seat assembly of claim 1,
wherein the first set of one or more actuatable assemblies are coupled to one or more one or more support members and the first set of one or more segmented seatback panels,
wherein selectively actuating the first set of one or more segmented seatback panels comprises selectively actuating the first set of one or more segmented seatback panels with respect to the one or more support members.

4. The aircraft passenger seat assembly of claim 1,
wherein the first set of one or more actuatable assemblies are coupled to one or more one or more support members and the base seatback panel,
wherein selectively actuating the first set of one or more segmented seatback panels comprises selectively actuating the one or more support members with respect to the base seatback panel.

5. The aircraft passenger seat assembly of claim 1, wherein the seatback assembly comprises:
a first lateral seatback section comprising:
a first base seatback panel coupled to the seatback frame;
a first set of one or more segmented seatback panels coupled to the first base seatback panel; and
a second set of one or more segmented seatback panels coupled to the first set of one or more segmented seatback panels; and
a second lateral seatback section coupled to the first lateral seatback section, the second lateral seatback section comprising:
a second base seatback panel coupled to the seatback frame;
a first set of one or more segmented seatback panels coupled to the second base seatback panel; and
a second set of one or more segmented seatback panels coupled to the first set of one or more segmented seatback panels.

6. The aircraft passenger seat assembly of claim 1, further comprising a seat structure, wherein the seatback assembly is pivotably coupled to the seat structure.

7. The aircraft passenger seat assembly of claim 1,
wherein the first set of offset angles include one or more offset angles defined as an angle between a plane of the base seatback panel, and a plane of a segmented seatback panel of the first set of one or more segmented seatback panels, and
wherein the second set of offset angles include one or more offset angles defined as an angle between a plane of a segmented seatback panel of the first set of one or more segmented seatback panels, and a plane of a segmented seatback panel of the second set of one or more segmented seatback panels.

8. The aircraft passenger seat assembly of claim 1, wherein the plurality of actuatable assemblies comprise at least one of a pneumatic bladder, a hydraulic apparatus, a spring apparatus, or a mechanical actuator.

9. The aircraft passenger seat assembly of claim 1, wherein the first set of one or more segmented panels comprise:
a first segmented panel coupled to a first lateral side of the base seatback panel; and
a second segmented panel coupled to a second lateral side of the base seatback panel opposite the first lateral side.

10. The aircraft passenger seat assembly of claim 9, wherein the second set of one or more segmented panels comprise:
a first segmented panel coupled to the first segmented panel of the first set of one or more segmented panels; and
a second segmented panel coupled to the second segmented panel of the first set of one or more segmented panels.

11. The aircraft passenger seat assembly of claim 1, wherein the first set of one or more segmented panels are pivotably coupled to the base seatback panel, and wherein the second set of one or more segmented panels are pivotably coupled to the first set of one or more segmented panels.

12. The aircraft passenger seat assembly of claim 1, further comprising an additional set of one or more segmented panels coupled to the second set of one or more segmented panels.

13. The aircraft passenger seat assembly of claim 1,
wherein a front seatback surface of the seatback assembly is configured to support an upper body of a passenger,
wherein the plurality of actuatable assemblies are configured to selectively actuate in order to adjust a profile of the front seatback surface.

* * * * *